United States Patent
Nitta (12) United States Patent (10) Patent No.: US 6,320,862 B1
(45) Date of Patent: Nov. 20, 2001

(54) MOBILE COMMUNICATION SYSTEM FOR COMMUNICATING WITH AN INTEGRATED SERVICES DIGITAL NETWORK

(75) Inventor: Toshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/063,294

(22) Filed: Apr. 21, 1998

(30) Foreign Application Priority Data

Apr. 22, 1997 (JP) .................................................. 9-104994

(51) Int. Cl.$^7$ ...................................................... H04Q 7/24
(52) U.S. Cl. .......................................... 370/401; 370/466
(58) Field of Search ................................... 370/328, 338, 370/401, 465, 466, 467, 420, 463, 524

(56) References Cited

U.S. PATENT DOCUMENTS

| | | |
|---|---|---|
| 5,450,472 | 9/1995 | Brax ...................................... 455/557 |
| 5,600,633 | 2/1997 | Jaisingh et al. ........................ 370/277 |
| 5,608,780 | 3/1997 | Gerszberg et al. .................... 455/436 |
| 5,655,001 * | 8/1997 | Cline et al. ............................ 370/328 |
| 5,771,275 * | 6/1998 | Brunner et al. ........................ 379/67 |
| 5,917,816 * | 6/1999 | Jacobsohn ............................. 370/352 |

FOREIGN PATENT DOCUMENTS

| | | |
|---|---|---|
| 0 700 225 A2 | 6/1996 | (EP) . |
| 8-70335 | 3/1996 | (JP) . |

OTHER PUBLICATIONS

Swedish Office Action dated Nov. 29, 2000, with English translation.

* cited by examiner

Primary Examiner—Min Jung
(74) Attorney, Agent, or Firm—McGinn & Gibb, PLLC

(57) ABSTRACT

A mobile communications system includes a switch connected to an inter-working unit and a circuit switching signaling converter. The inter-working unit includes a first terminator for terminating a first transfer procedure of user information for wireless transmission and a first interface to the ISDN for the user information according to ITU-T Recommendation V.110. The circuit switching signaling converter includes a second terminator for terminating a second transfer procedure of a circuit switching signal for wireless transmission and a second interface to the ISDN for the circuit switching signal according to ISDN User Part (ISUP) of common channel signaling system No. 7.

18 Claims, 9 Drawing Sheets

MOBILE COMMUNICATION SYSTEM FOR COMMUNICATING WITH AN INTEGRATED SERVICES DIGITAL NETWORK

BACKGROUND OF THE INVENTION

1. Field of the Invention

The present invention generally relates to a mobile communications system, and in particular to a mobile communications system connected to an integrated services digital network (ISDN) and a call setup method and system from a mobile terminal to the ISDN network.

2. Description of the Related Art

A mobile communications network connected to a fixed communications network has been disclosed in Japanese Patent Unexamined Publication No. 8-70335. A mobile communication switching system of the mobile communications network is provided with a plurality of wireless protocol controllers and a plurality of wired protocol controllers. In the case where a connection is set up between a mobile terminal and a data terminal connected to the fixed communications network, a pair of wireless and wired protocol controllers are selected to allow data communications between the mobile terminal and the data terminal.

Such a data communications system is used to provide a subscriber of the mobile communication system with Group 3 facsimile communication service, V. 42ANNEX modem communication service and high-speed data transmission service. These services are proposed as follows. The Group 3 facsimile communication service uses ARQ (Automatic Repeat Request) procedure for wireless-section protocol and ITU-T Recommendation T.30 and T.4 for wired-section protocol. The V.42ANNEX modem communication service uses FEC (Forward Error Correction) procedure and bit-interleave scheme for wireless-section protocol and ITU-T Recommendation V.42ANNEX for wired-section protocol. The high-speed data transmission service uses ARQ procedure for wireless-section protocol and arbitrary data circuit-terminating equipment (DCE) for wired-section protocol.

When a mobile terminal requests a call setup for data communication, however, some disadvantages are developed. In the case where a new data communication service is provided to the existing mobile communications system, it is necessary to provide all the mobile terminals with a new function of specifying the respective types of wireless and wired data communication protocols and producing a circuit switching signal including them.

Therefore, the user must know the wired data communication protocol used by the data terminal of an opposite party before a mobile terminal requests a call setup for data communication.

Further, the existing mobile communications system is not provided with a means for terminating the wired data communication protocol required to communicate with an ISDN terminal, Therefore, the mobile terminal cannot be connected to the ISDN terminal.

SUMMARY OF THE INVENTION

An object of the present invention is to provide a method and system which can provide a data communication service between a mobile terminal and an ISDN terminal without changing the wireless-section data communication protocol.

Another object of the present invention is to provide a method and system which can provide a data communication service depending on the capability of the data terminal of an opposite party.

According to an aspect of the present invention, a mobile communications system includes a first terminator for terminating a first transfer procedure of user information for wireless transmission and a second terminator for terminating a second transfer procedure of a circuit switching signal for wireless transmission. Further, it is provided with a first interface to the ISDN for the user information according to ITU-T Recommendation V.110 and a second interface to the ISDN for the circuit switching signal according to ISDN User Part (ISUP) of common channel signaling system No. 7.

Since the first interface of V.110 can converts data and data rate between the radio transmission and the ISDN, an ISDN connection service can be provided to the mobile communications system.

According to another aspect of the present invention, the mobile communications system is further provided with a third interface to the ISDN for user information according to modem information for an analog public switched network and a selector for selecting one of the first and third interfaces depending on an opposite party data terminal. The second interface may selectively transmit a first setup message and a second setup message to the ISDN depending on the opposite party data terminal. The first setup message may have an information element set to an unlimited bearer service of 64 kbps. The second message may have the information element set to a 3.1 kHz-Audio bearer service of 64 kbps.

Since the selector can select one of the V.110 and the modem information, an ISDN connection service can be provided to the mobile communications system depending on the capability of the data terminal of an opposite party.

DETAILED DESCRIPTION OF THE PREFERRED EMBODIMENTS

SYSTEM

Figure 1:
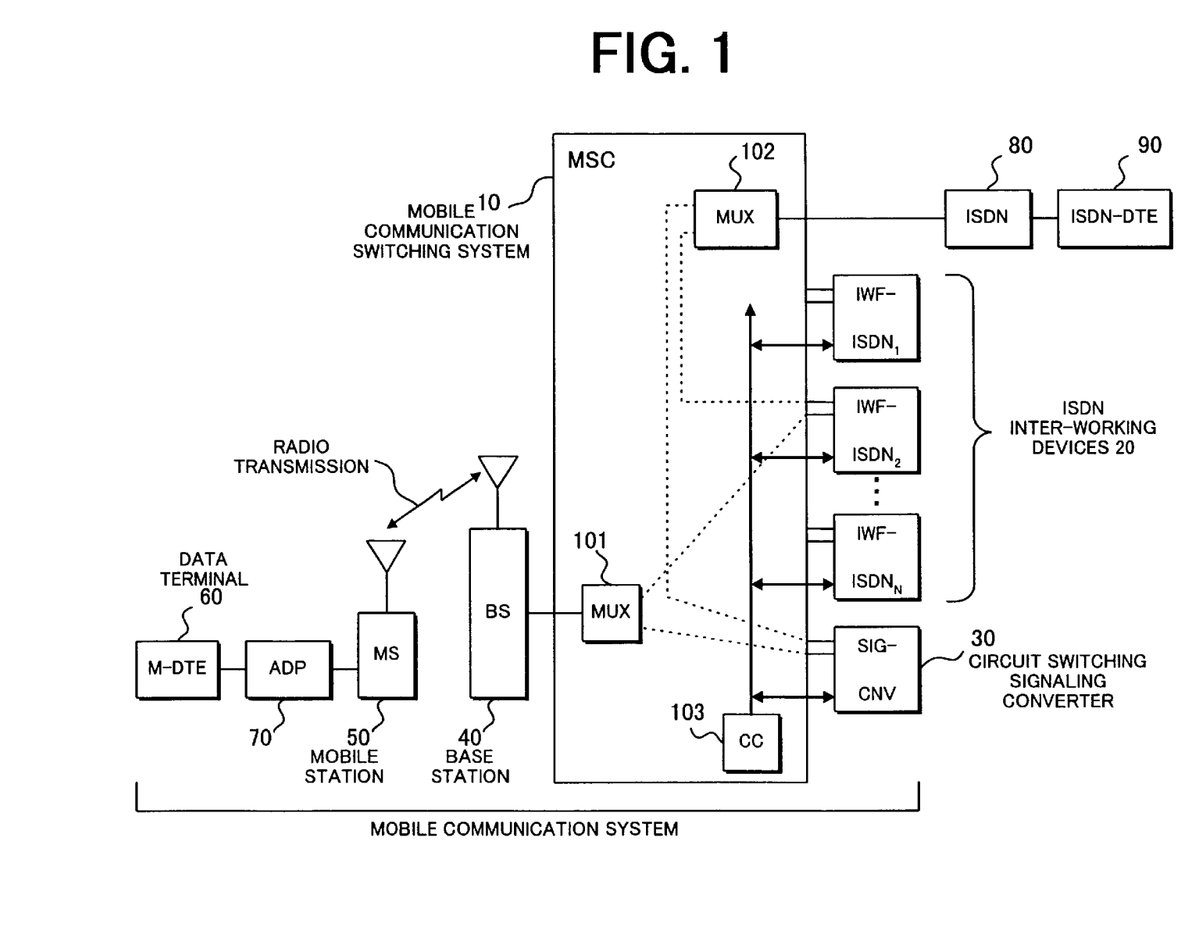
FIG. 1 is a block diagram showing a mobile communication system according to an embodiment of the present invention.

Referring to FIG. 1, a mobile communication system according to the present invention is provided with a mobile communication switching system (hereinafter referred to as MSC) 10 having a plurality of ISDN inter-working devices 20 and a circuit switching signaling converter (SIG-CNV) 30 connected thereto. Here, N (N>1) ISDN inter-working devices IWF-ISDN$_1$ to IWF-ISDN$_N$ are connected to the mobile communication switching system 10.

The MSC 10 is connected to a plurality of radio base stations each forming a radio zone for communicating with mobile stations located therein. Here, a base station (BS) 40 can be communicated with a mobile station (MS) 50. The mobile station 50 is connected to a data terminal (M-DTE) 60 by an adapter 70.

The MSC 10 is further connected to an ISDN 80 which is connected to an ISDN data terminal (ISDN-DTE) 90 or a set of an ISDN terminal adapter and a data terminal (not shown).

The MSC 10 is comprised of a time division switch (TDSW), multiplexer/demultiplexer (hereinafter referred to as MUX) 101 connected to the base station 40, a MUX 102 connected to the ISDN 80, and a controller (CC) 103. The controller 103 controls the operations of the TDSW and a setup operation using the IWF-ISDNs 20 and the SIG-CNV 30 as will be described later. More specifically, the controller 103 controls the paths of the TSDW such that each of the IWF-ISDNs 20 and the SIG-CNV 30 can be connected to the MUXs 101 and 102 to set up a connection between the M-DTE 60 and the ISDN-DTE 90.

The MUX 101 multiplexes a user information transfer channel and a circuit switching signal transfer channel into a transmission line connected to the base station 40 and demultiplexes the multiplexed transmission line into the user information transfer channel and the circuit switching signal transfer channel which are transferred to a selected one of the IWF-ISDNs 20 and the SIG-CNV 30 through paths formed by the TDSW, respectively.

The MUX 102 multiplexes a user information transfer channel and a common channel signaling system No. 7 (CCSS-7) channel into an ISDN line connected to the ISDN 80 and demultiplexes the multiplexed ISDN line into the user information transfer channel and the CCSS-7 channel which are transferred to a selected one of the IWF-ISDNs 20 and the SIG-CNV 30 through paths formed by the TDSW, respectively.

INTER-WORKING UNIT

Figure 2:
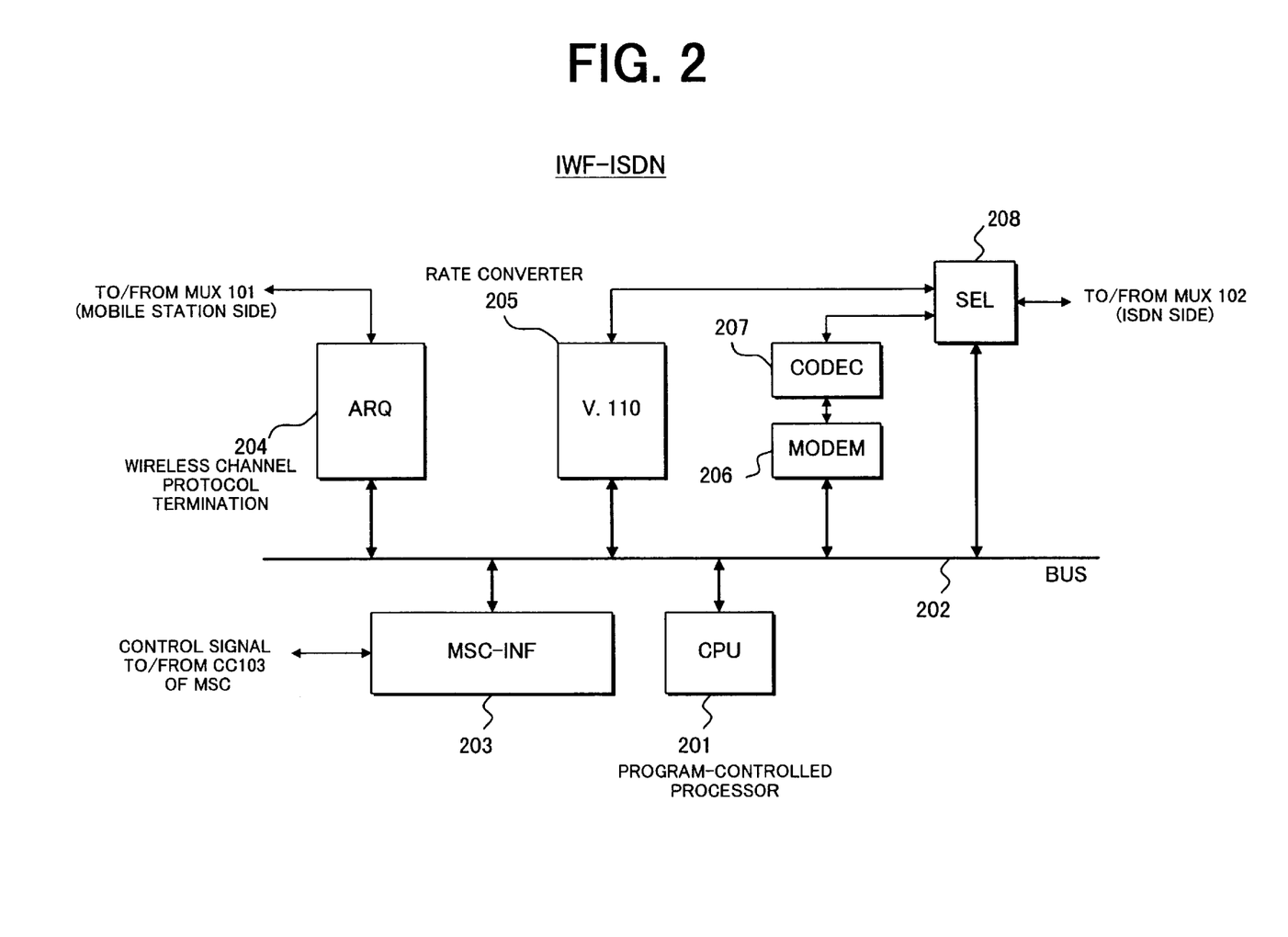
FIG. 2 is a block diagram showing an ISDN inter-working device connected to a mobile communication switching system of the embodiment.

Referring to FIG. 2, each of the IWF-ISDN devices 20 is comprised of a processor (CPU) 201 which is connected to a bus 202 including a control bus and a data bus through which all the sections 203–208 of the IWF-ISDN device are controlled and necessary data are transferred.

An interface circuit (MSC-INF) 203 is connected to a controller 103 of the MSC 10 and transmits and receives a control signal such as an on-hook or off-hook signal to and from the controller 103.

A wireless channel protocol termination section 204 may be connected to the MUX 101 through the TDSW of the MSC 10 and performs the termination of a user information transfer procedure of the radio transmission. In other words, the wireless channel protocol termination section 204 is an interface of user information transfer channel between the radio transmission and the MSC 10. Here, ARQ (Automatic Repeat Request) is used as the user information transfer procedure. Therefore, hereinafter, the wireless channel protocol termination section 204 is referred to as ARQ 204.

Another interface of user information transfer channel between the MSC 10 and the ISDN 80 is formed with a rate converter 205, a modulator/demodulator (MODEM) 206, an encoder/decoder (CODEC) 207 and a selector 208.

The rate converter 205 performs a conversion between the data and transmission rate of user information input/output by the ARQ 204 and the data and transmission rate of B channel of the ISDN 80 according to ITU-T Recommendation V.110. In this case, the transmission rate of the radio transmission is smaller than that of the B channel of the ISDN 80.

The modulator/demodulator (modem) 206 is used to perform a conversion between the data and transmission rate of user information input/output by the ARQ 204 and the modem signal, the modem transfer procedure and transmission rate for an analog public telephone switched network (PTSN).

The encoder/decoder (codec) 207 is provided between the modem 206 and the selector 208. The codec 207 makes an interface between the modem 206 and the ISDN 80 according to pulse code modulation (PCM) of 64 bps.

The selector 208 selects one of a V.110 route through the rate converter 205 and a modem route through the modem 206 under control of the processor 201 which is further controlled by the controller 103 of MSC 10. Therefore, the interface of user information transfer channel between the MSC 10 and the ISDN 80 can be switched between the V.110 route and the modem route by the selector 208.

CIRCUIT SWITCHING SIGNALING CONVERTER

Figure 3:
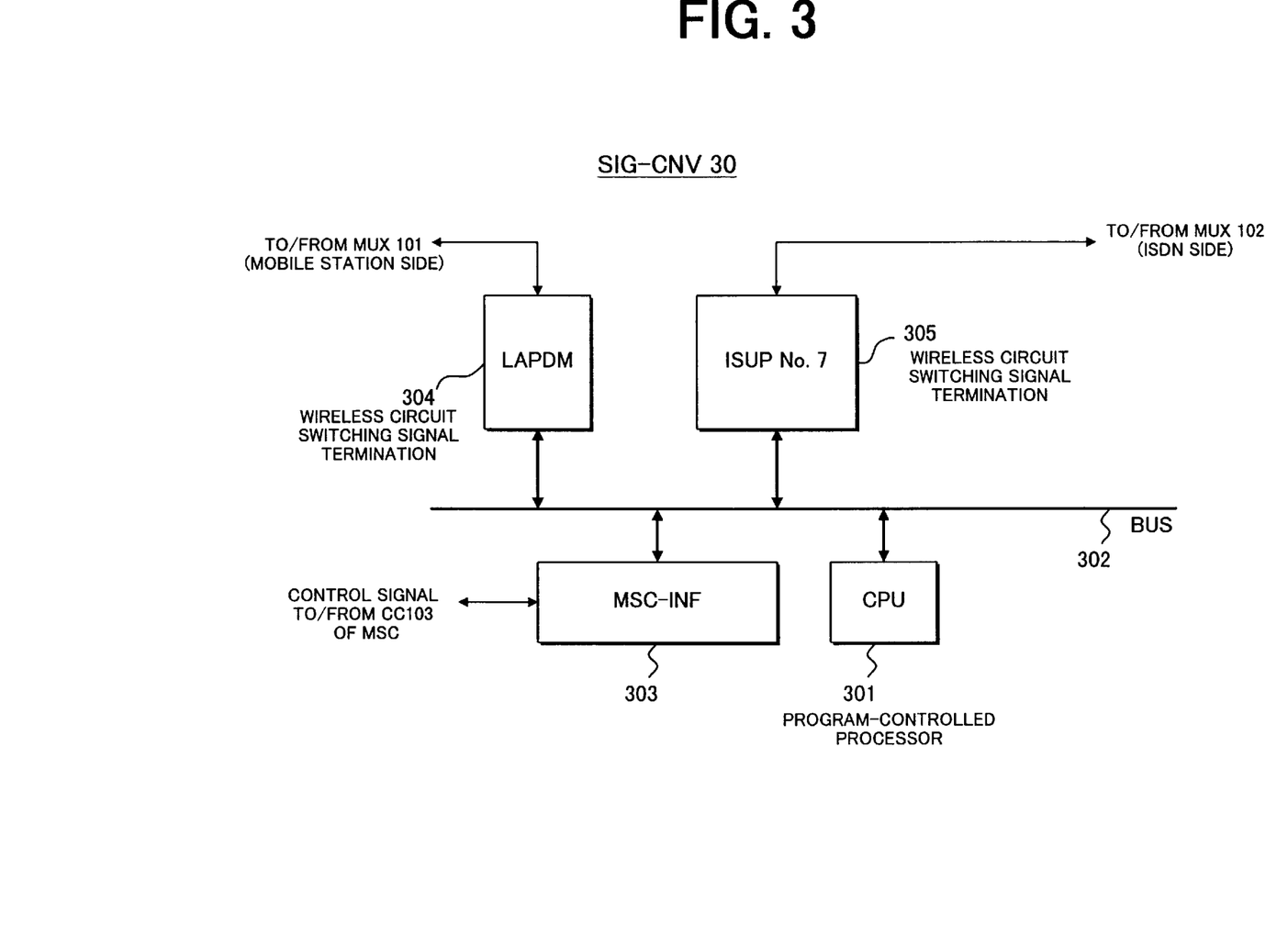
FIG. 3 is a block diagram showing a circuit switching signaling converter connected to the mobile communication switching system of the embodiment.

Referring to FIG. 3, the SIG-CNV device 30 is comprised of a processor (CPU) 301 which is connected to a bus 302 including a control bus and a data bus through which all the sections 303–305 of the SIG-CNV device are controlled and necessary data are transferred.

An interface circuit (MSC-INF) 303 is connected to a controller 103 of the MSC 10 and transmits and receives a control signal such as a call process signal to and from the controller 103.

A wireless circuit switching signal termination section 304 may be connected to the MUX 101 through the TDSW of the MSC 10 and performs the termination of a circuit switching signal transfer procedure of the radio transmission. Here, LAPDM (Link Access Procedure D-channel Mobile) is used as the circuit switching signal transfer procedure. Therefore, hereinafter, the wireless circuit switching signal termination section 304 is referred to as LAPDM 304.

A wired circuit switching signal termination section 305 may be connected to the MUX 102 through the TDSW of the MSC 10 and performs the termination of a call control message defined in an ISUP (ISDN User Part) of CCSS-7 which is used in the ISDN 80 or inter-ISDN. Hereinafter, the wired circuit switching signal termination section 305 is referred to as ISUPNo.7 305.

MOBILE STATION

Figure 4:
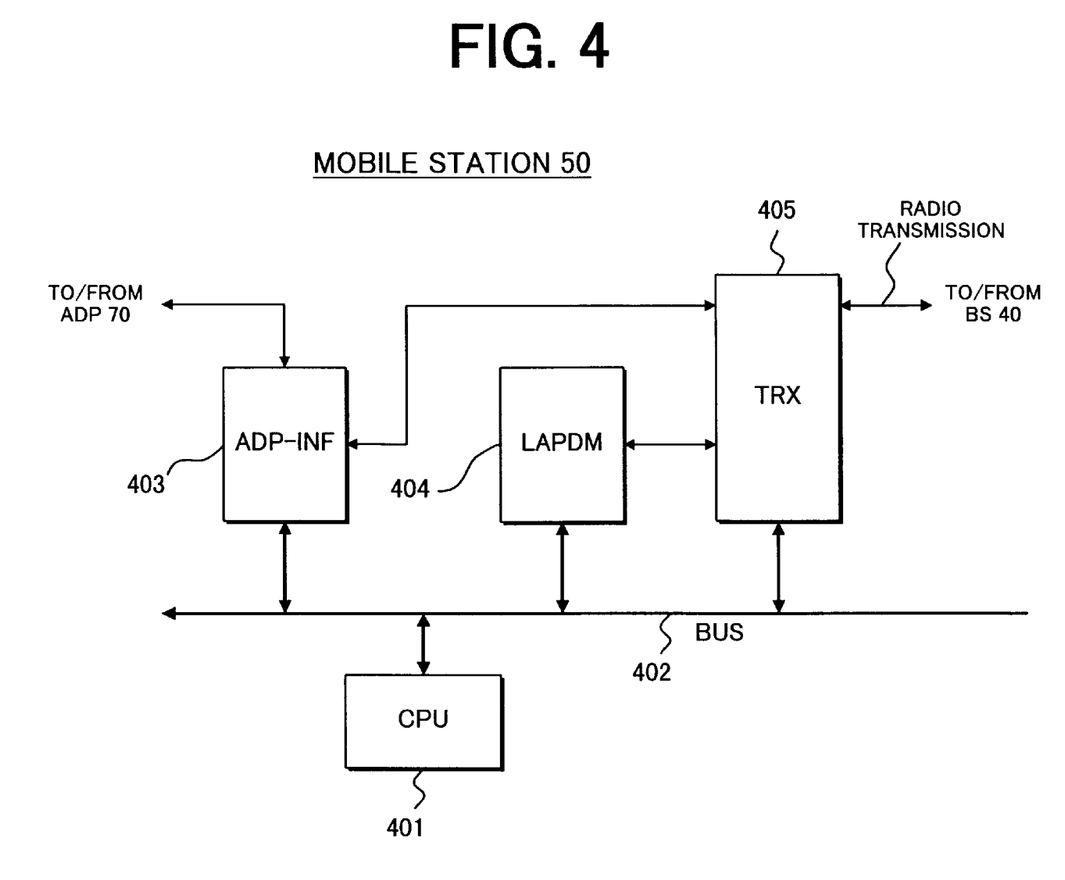
FIG. 4 is a block diagram showing a radio data communication adapter connected to a mobile station of the embodiment.

Referring to FIG. 4, the mobile station 50 is comprised of a processor (CPU) 401 which is connected to a bus 402 including a control bus and a data bus through which all the sections 403–405 of the mobile station 50 are controlled and necessary data are transferred.

An adapter interface (ADP-INF) 403 transmits and receives user information to and from the adapter 70. A wireless circuit switching signal termination section 404 performs the termination of a circuit switching signal transfer procedure of the radio transmission. Since LAPDM is used as the circuit switching signal transfer procedure, the wireless circuit switching signal termination section 404 is hereinafter referred to as LAPDM 404.

A radio system 405 includes a radio transmitter and a radio receiver which are used to communicate with a nearest base station 40 through a radio channel. When receiving data from the ADP 70 through the ADP-INF 403, the processor 401 transfers the data to the LAPDM 404 which produces transmission data according to the LAPDM. The radio system 405 modulates a carrier according to the transmission data and transmits a radio signal to the base station 40. When receiving a radio signal from the base station 40, it is demodulated to received data which is transferred to the LAPDM 404.

ADAPTER

Figure 5:
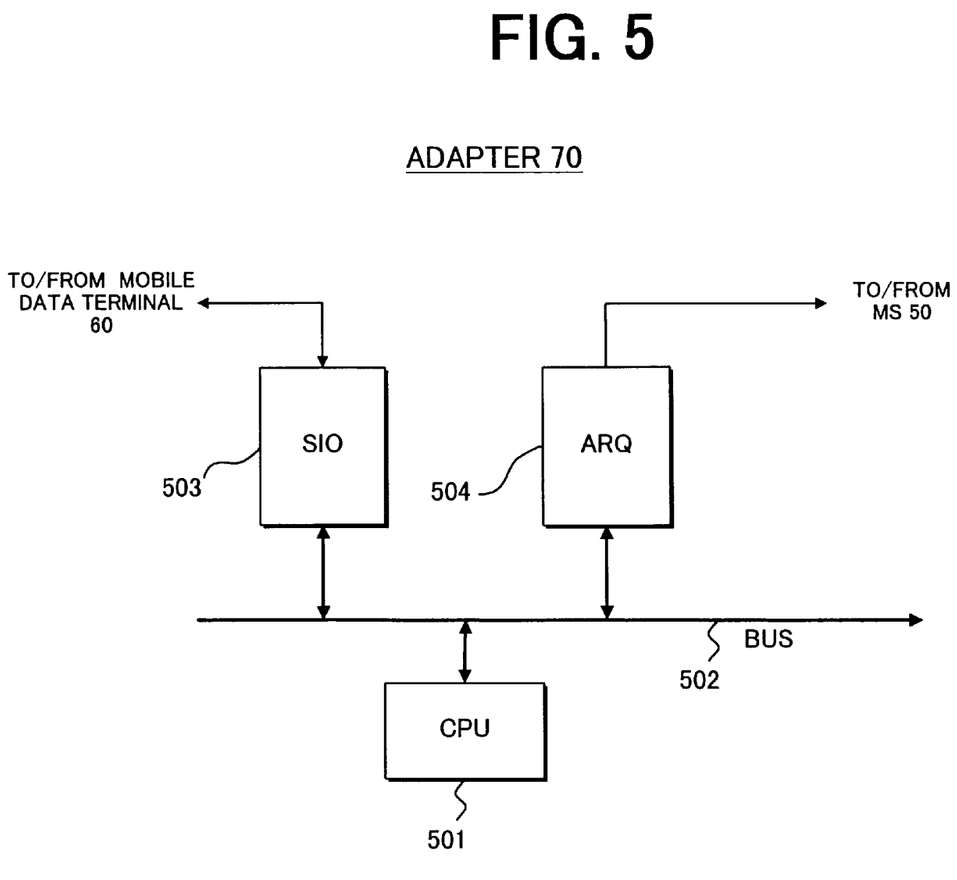
FIG. 5 is a block diagram showing a mobile station of the embodiment.

Referring to FIG. 5, the adapter 70 is comprised of a processor (CPU) 501 which is connected to a bus 502 including a control bus and a data bus through which a serial I/O interface circuit 503 and a wireless protocol termination section 504 are controlled and necessary data are transferred. The wireless protocol termination section 504 performs the termination of the user information transfer procedure of the radio transmission. Here, ARQ is employed.

As described above, the user information transfer procedure of the radio transmission (here, ARQ) is terminated by the ARQ 204 of the selected IWF-ISDN and the ARQ 504 of the adapter 70. The circuit switching signal transfer procedure of the radio transmission (here, LAPDM) is terminated by the LAPDM 303 of the SIG-CNV 30 and the LAPDM 404 of the mobile station 50.

OPERATIONS

Figure 6:
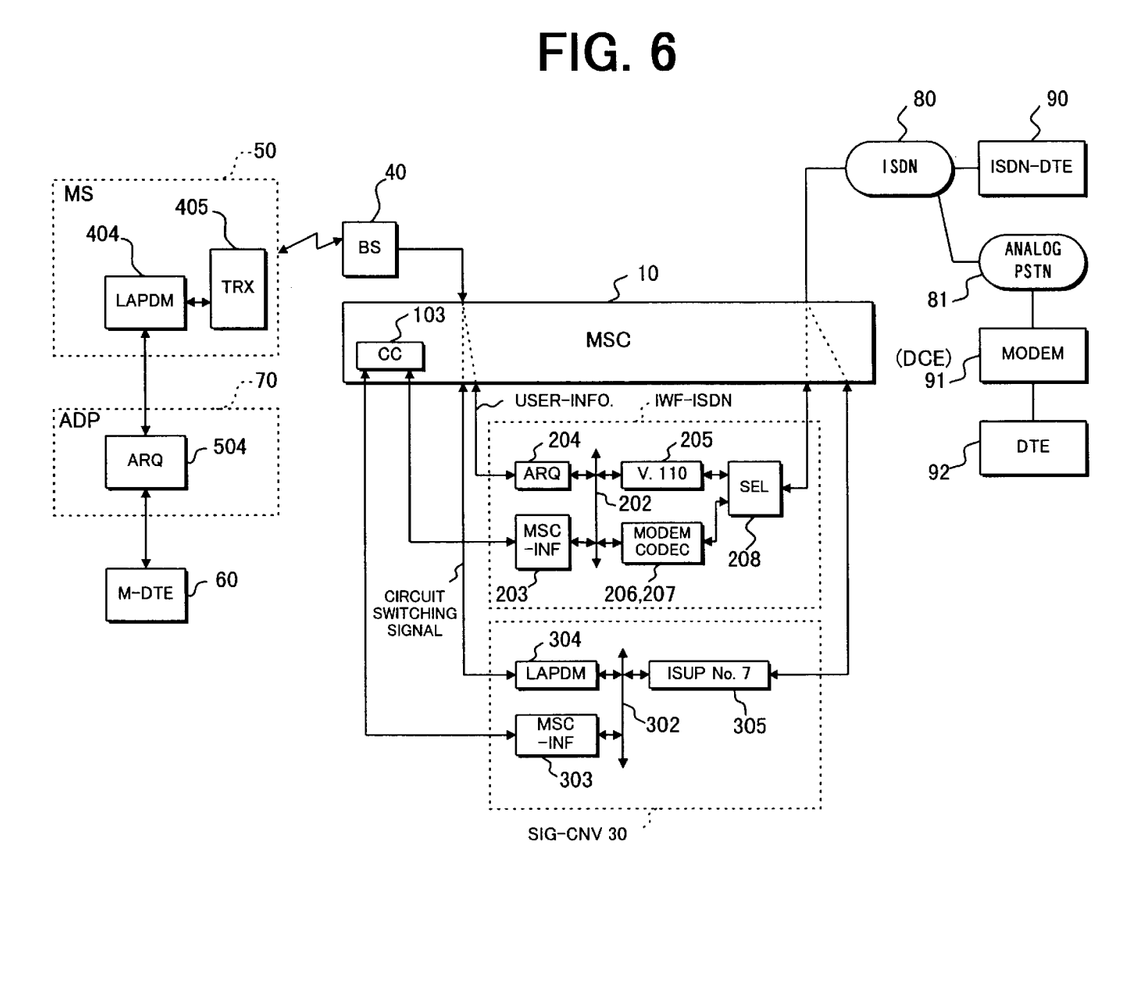
FIG. 6 is a block diagram showing a whole communication system for explanation of operations of the embodiment.

Next, referring to FIG. 6 where blocks as previously described with reference to FIGS. 1–5 are denoted by the same reference numerals, operations of the system will be described. In FIG. 6, the ISDN 80 is connected to an ISDN-DTE 90 as well as an analog PSTN 81 through which a connection may be set up between the mobile data terminal 60 and an opposite party including a modem 91 and a data terminal 92.

OPERATION VIA ISDN and ANALOG PSTN

Figure 7:
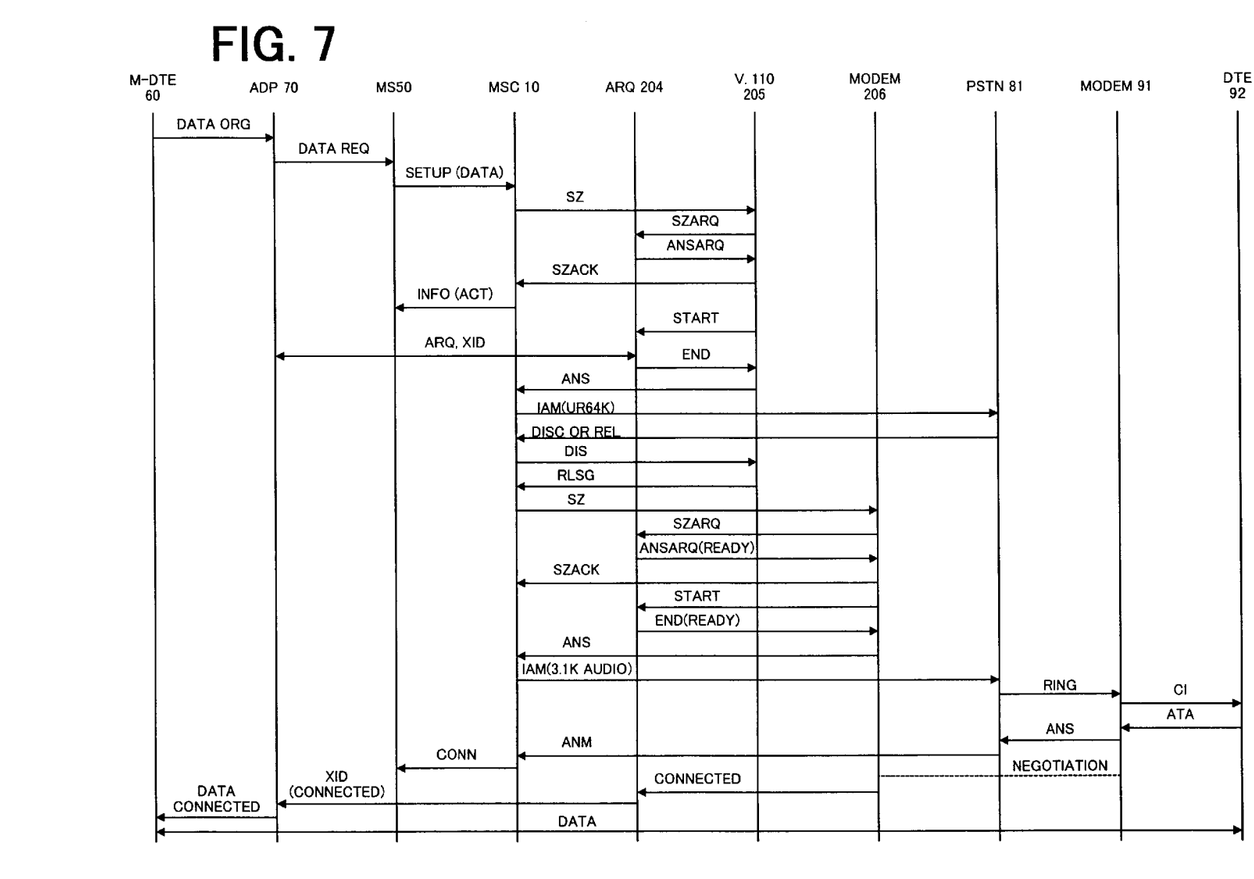
FIG. 7 is a sequence diagram showing a first operation of the embodiment when an opposite party is an analog data terminal.

Referring to FIG. 7, when receiving a call originating signal for data communication (Data ORG) from the M-DTE 60, the adapter 70 transmits a setup element for data communication (Data REQ) to the mobile station 50. When receiving the Data REQ from the adapter 70, the mobile station 50 transmits a setup message conveying an information request of data communication, SETUP(Data), to the LAPDM 304 of the SIG-CNV 30 through the base station 40 and the MSC 10.

When receiving the SETUP(Data) from the mobile station 50, the LAPDM 304 of the STG-CNV 30 sends the controller 103 of the MSC 10 a request signal for an IWF-ISDN through the MSC-INF 303. The controller 103 selects an available one of the IWF-ISDN devices 20. The controller 103 transmits a startup signal (SZ) to the V.110 rate converter 205 through the MSC-INF 203 of the selected IWF-ISDN device The startup signal (SZ) causes the V.110 rate converter 205 to first start a predetermined sequence operation on the assumption that a destination data terminal would be an ISDN data terminal because the SETUP(Data) does not specify the type of the destination data terminal. First, the V.110 rate converter 205 sends a startup signal (SZARQ) to the ARQ 204. When receiving a response signal (ANSARQ) indicating a normal state from the ARQ 204, the V.110 rate converter 205 sends a startup completion signal (SZACK) back to the controller 103 of the MSC 10 and a startup signal (START) to the ARQ 204. The startup signal (START) causes the ARQ 204 to start the user information transfer procedure.

When receiving the startup completion signal (SZACK), the controller 103 instructs the LAPDM 304 to transmit an additive information INFO(Act) having an information element set to "ACTIVE" to the mobile station 50. On the other hand, when the ARQ 204 starts the user information transfer procedure, various signals are exchanged between the ARQ 504 of the adapter 70 and the ARQ 204 of the IWF-ISDN, known as Exchange Identification (ARQ,XID).

After having completed the (ARQ,XID), the ARQ 204 sends an end signal (END) to the V.110 rate converter 205, which in turn sends a response signal (ANS) to the controller 103 of the MSC 10.

In this manner as described above, the user information transfer of the radio transmission is ready for use.

Subsequently, the controller 103 of the MSC 10 instructs the ISUPNo.7 device 305 of the SIG-CNV 30 to try to transmit an IAM (Initial Address) signal, IAM(UR64k), to the ISDN 80, where the IAM(UR64k) signal is a SETUP message having an information element set to the 64 kbps unlimited bearer service using CCSS-7 ISUP.

In the case where the destination data terminal 92 is not directly connected to the ISDN 80 but via the analog PSTN 81, a call disconnect message DISC or a release message REL is returned from the ISDN 80 to the MSC 10. Therefore, when receiving DISC or REL message after transmitting the IAM(UR64k) signal, the controller 103 of the MSC 10 determines that the destination data terminal is a non-ISDN terminal. In this case, the controller 103 changes the selector 208 of the IWF-ISDN from the V.110 route to the modem route and deactivates the V.110 rate converter 205 by transmitting a disconnect signal DIS to the V.110 rate converter 205 and receiving a release signal RLSG therefrom.

After changing the interface to the ISDN 80 to the modem route, the controller 103 transmits a startup signal (SZ) to the modem 206 through the MSC-INF 203 of the selected IWF-ISDN device. The startup signal (SZ) causes the modem 206 to start a predetermined sequence operation. First, the modem 206 sends a startup signal (SZARQ) to the ARQ 204. When receiving a response signal (ANSARQ (READY)) indicating a normal state from the ARQ 204, the modem 206 sends a startup completion signal (SZACK) back to the controller 103 of the MSC 10 and a startup signal (START) to the ARQ 204. The startup signal (START) causes the ARQ 204 to start the user information transfer procedure.

Since the (ARQ,XID) has been completed as described before, the ARQ 204 sends an end signal (END(READY)) to the modem 206, which in turn sends a response signal (ANS) to the controller 103 of the MSC 10.

Subsequently, the controller 103 of the MSC 10 instructs the ISUPNo.7 device 305 of the STG-CNV 30 to try to transmit an IAM(3.1kAudio) signal to the ISDN 80, where the IAM(3.1kAudio) signal is a SETUP message having an information element set to the 64 kbps 3.1 kHZ Audio bearer service using CCSS-7 ISUP.

When receiving a calling signal RING from the analog PSTN 81, the modem 91 sends a calling indicator CI to the data terminal 92. When receiving a response command ATA from the date terminal 92, the modem 91 sends a response signal ANS back to the analog PSTN 81 which in turn sends a response signal ANM back to the controller 103 of the MSC 10 through the ISUP No.7 device 305 of the SIG-CNV 30. After that, negotiations are started between the modem 206 of the IWF-ISDN and the modem 91 through a setup path.

When the negotiations are successfully ended, the modem 206 sends a connection completion signal (CONNECTED), to the ARQ 204. When receiving the connection completion signal (CONNECTED), the ARQ 204 sends a connection completion notice signal XID(CONNECTED) to the ARQ 504 of the ADP 70 according to the user information transfer procedure. Subsequently, the ADP 70 sends a connection completion signal (Data Connected) to the data terminal 60. In this manner, a connection for data communication is established between the data terminal 60 and the data terminal 92.

OPERATION VIA ISDN ONLY

Figure 8:
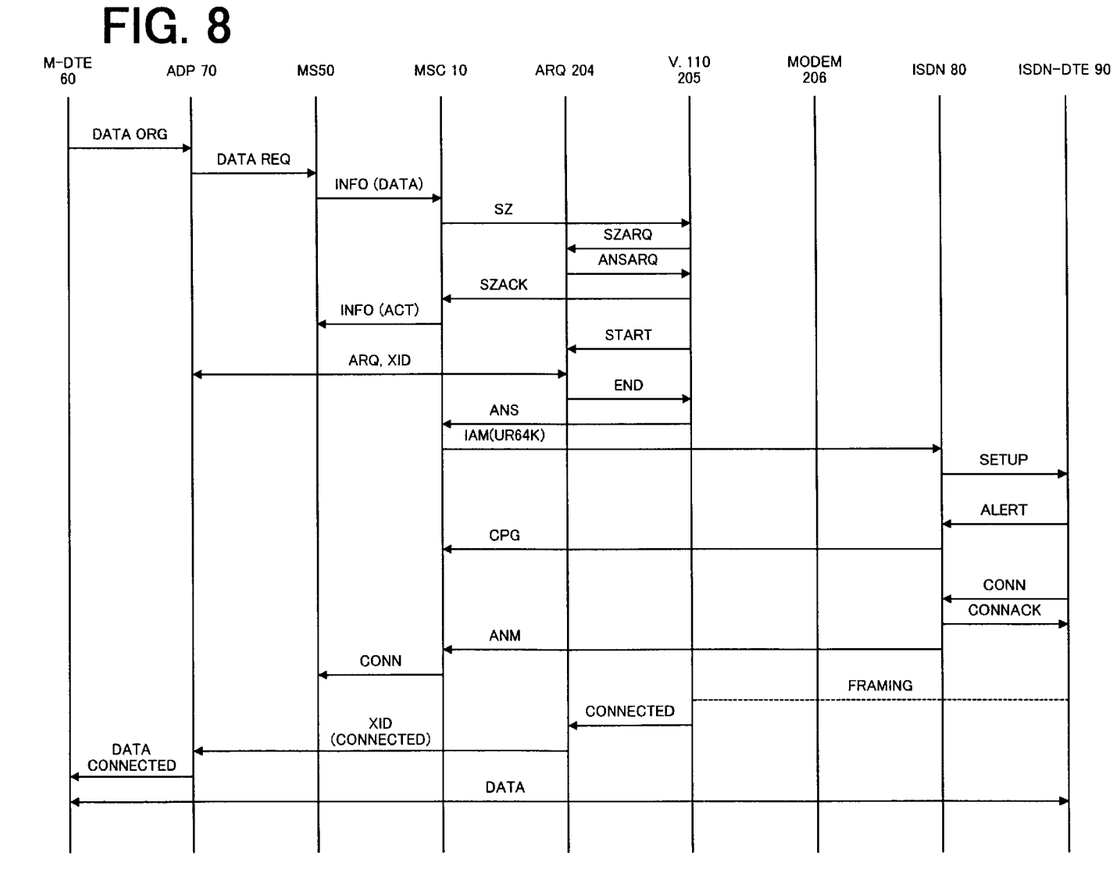
FIG. 8 is a sequence diagram showing a second operation of the embodiment when an opposite party is an ISDN data terminal.

As shown in FIG. 8, the sequence from a call originating signal (Data ORG) originated by the M-DTE 60 to the IAM(UR64k) signal transmitted by the ISUPNo.7 device 305 of the SIG-CNV 30 is the same as that of FIG. 7.

In the case where the destination data terminal 90 is an ISDN data terminal directly connected to the ISDN 80, however, a SETUP signal is transmitted from the ISDN 80 to the ISDN data terminal 90 and an ALERT signal is transmitted back to the ISDN 80 which in turn transmits a CPG signal to the ISUPNo.7 device 305 of the SIG-CNV 30.

When the ISDN data terminal 90 is made off-hook, a CONN signal is sent to the ISDN 80 which in response to the CONN signal sends a CONN ACK signal back to the ISDN data terminal 90. Further the ISDN 80 transmits an ANM signal to the the ISUPNo.7 device 305 of the SIG-CNV 30. Thereafter, framing is started between the V.110 rate converter 205 of the IWF-ISDN and the ISDN data terminal 90 through a setup path.

When the framing is successfully ended, the the V.110 rate converter 205 sends a connection completion signal (CONNECTED) to the ARQ 204. When receiving the connection completion signal (CONNECTED), the ARQ 204 sends a connection completion notice signal XID (CONNECTED) to the ARQ 504 of the ADP 70 according to the user information transfer procedure. Subsequently, the ADP 70 sends a connection completion signal (Data Connected) to the data terminal 60. In this manner, a connection for data communication is established between the data terminal 60 and the ISDN data terminal 90.

OPERATION OF VOICE AND DATA COMMUNICATIONS

Figure 9:
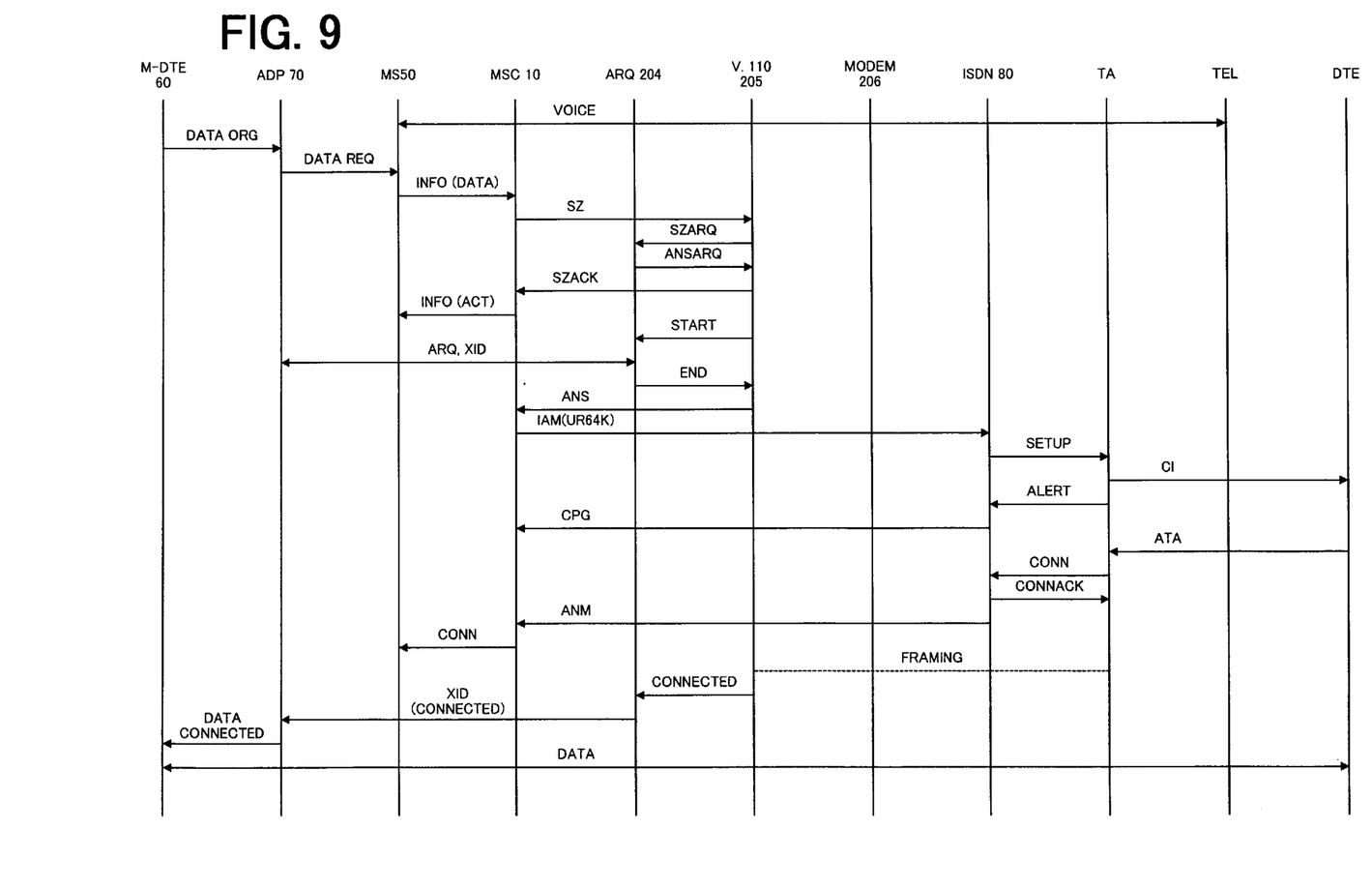
FIG. 9 is a sequence diagram showing a third operation of the embodiment when data communication is started in voice communication.

In the case of the opposite party device including a terminal adapter (TA) connected to a telephone (TEL) and a data terminal (DTE), both voice and data communications can be concurrently made using two B-channels of the ISDN 80.

As shown in FIG. 9, while the mobile station 50 of a mobile communication subscriber is communicating with the telephone TEL of the opposite party, a call originating signal for data communication (Data ORG) can be originated by the data terminal 60. When receiving the Data ORG signal from the M-DTE 60, the adapter 70 transmits a Data REQ signal to the mobile station 50. When receiving the Data REQ from the adapter 70, the mobile station 50 transmits an INFO(Data) signal to the MSC 10, where the INFO (Data) signal s a SETUP message having an information element set to "data communication".

The sequence from a startup signal SZ to the Data (Connected) signal is almost the same as that of FIG. 8. Since the data terminal (DTE) is connected to the terminal adapter (TA), the following steps are different. When receiving a SETUP signal from the ISDN 80, the terminal adapter (TA) sends a calling indicator CI to the data terminal (DTE). When receiving a response command ATA from the date terminal, the terminal adapter (TA) transmits a CONN signal to the ISDN 80. After the ISDN 80 transmits an ANM signal to the the ISUPNo.7 device 305 of the SIG-CNV 30, framing is started between the V.110 rate converter 205 of the IWF-ISDN and the terminal adapter (TA) through a setup path.

What is claimed is:

1. A mobile communications system connected to an integrated services digital network (ISDN), comprising:
   a first terminator for terminating a first transfer procedure of user information for wireless transmission;
   a second terminator for terminating a second transfer procedure of a circuit switching signal for wireless transmission;
   a first interface to the ISDN for the user information according to ITU-T Recommendation V.110; and
   a second interface to the ISDN for the circuit switching signal according to ISDN User Part (ISUP) of common channel signaling system No. 7.

2. The mobile communications system according to claim 1, further comprising:
   a third interface to the ISDN for user information according to modem information for an analog public switched network; and
   a selector for selecting one of the first and third interfaces depending on an opposite party data terminal.

3. The mobile communications system according to claim 2, wherein the second interface selectively transmits a first setup message and a second setup message to the ISDN depending on the opposite party data terminal, the first setup message having an information element set to an unlimited bearer service of 64 kbps, and the second message having the information element set to a 3.1 kHz-Audio bearer service of 64 kbps.

4. The mobile communications system according to claim 3, wherein the selector first selects the first interface and the second interface transmits the first setup message and, if a connection fails to be set up, then the selector selects the third interface and the second interface transmits the second setup message to the ISDN.

5. The mobile communications system according to claim 1, wherein the second interface selectively transmits a first setup message and a second setup message to the ISDN depending on information transfer capability of an opposite party data terminal, the first setup message having an information element set to an unlimited bearer service of 64 kbps, and the second message having the information element set to a 3.1 kHz-audio bearer service of 64 kbps.

6. The mobile communications system according to claim 5, wherein the second interface determines that the opposite party data terminal is connected to an analog public switched network when receiving a call disconnection message from the ISDN after transmitting the first setup message to the ISDN.

7. The mobile communications system according to claim 5, further comprising:
   a third interface to the ISDN for user information according to modem information for the analog public switched network; and
   a selector for selecting one of the first and third interfaces depending on whether the second interface receives a call disconnection message from the ISDN after transmitting the first setup message to the ISDN.

8. The mobile communications system according to claim 1, wherein a mobile communication switching system comprises the first terminator, the second terminator, the first interface, and the second interface.

9. The mobile communication system according to claim 8, additionally comprising:
a base station configured to receive wireless communications from a mobile station.

10. The mobile communications system according to claim 9, wherein the mobile communication switching system is configured to receive and transmit Link Access Procedure D-channel Mobile (LAPDM) compliant communications to and from the base station.

11. A setup method for setting up a connection between a first data terminal of a mobile communications system and a second data terminal through an integrated services digital network (ISDN), comprising the steps of:
terminating a first transfer procedure of user information for wireless transmission;
converting data and transfer rate of the user information from the wireless transmission to the ISDN according to ITU-T Recommendation V.110;
terminating a second transfer procedure of a circuit switching signal for wireless transmission;
converting the circuit switching signal for wireless transmission to a call control message of the ISDN according to ISDN User Part (ISUP) of common channel signaling system No. 7;
transmitting the call control message to the ISDN; and
setting up a connection between the first data terminal and the second data terminal through the ISDN depending on a response message to the call control message.

12. The setup method according to claim 11, wherein the call control message is one of a first setup message and a second setup message which are selectively transmitted to the ISDN depending on information transfer capability of the second data terminal, the first setup message having an information element set to an unlimited bearer service of 64 kbps, and the second message having the information element set to a 3.1 kHz-audio bearer service of 64 kbps.

13. The setup method according to claim 12, wherein the step of transmitting the call control message comprises the steps of:
transmitting a first setup message to the ISDN; and
when receiving one of DISC and REL messages in response to the first setup message, transmitting a second setup message to the ISDN.

14. A setup method for setting up a connection between a first data terminal of a mobile communications system and a second data terminal through an integrated services digital network (ISDN), comprising the steps of:
terminating a first transfer procedure of user information for wireless transmission;
converting data and transfer rate of the user information from the wireless transmission to the ISDN according to a selected one of ITU-T Recommendation V.110 and modem information for an analog public switched network;
terminating a second transfer procedure of a circuit switching signal for wireless transmission;
converting the circuit switching signal for wireless transmission to a call control message of the ISDN according to ISDN User Part (ISUP) of common channel signaling system No. 7, wherein the call control message is one of a first setup message and a second setup message, the first setup message having an information element set to an unlimited bearer service of 64 kbps, and the second message having the information element set to a 3.1 kHz-audio bearer service of 64 kbps;
transmitting the first setup message to the ISDN with selecting the ITU-T Recommendation V.110;
setting up a connection between the first data terminal and the second data terminal according to the ITU-T Recommendation V.110 when receiving an answer message to the first setup message from the ISDN;
transmitting the second setup message to the ISDN with selecting the modem information for the analog public switched network when receiving one of DISC and REL messages from the ISDN; and
setting up a connection between the first data terminal and the second data terminal through the ISDN and the analog public switched network when receiving an answer message to the second setup message from the ISDN.

15. A mobile communications system connected to an integrated services digital network (ISDN), comprising;
a switch for connecting the mobile communications system and the ISDN;
a base station connected to the switch; and
a mobile subscriber terminal located in a radio zone formed by the base station, for communicating with the base station by radio;
wherein the switch comprises an inter-working unit and a circuit switching signal converter,
the inter-working unit comprising:
a first terminator for terminating a first transfer procedure of user information for wireless transmission; and
a first interface to the ISDN for the user information according to ITU-T Recommendation V.110, and
the circuit switching signal converter comprising:
a second terminator for terminating a second transfer procedure of a circuit switching signal for wireless transmission; and
a second interface to the ISDN for the circuit switching signal according to ISDN User Part (ISUP) of common channel signaling system No. 7.

16. The mobile communications system according to claim 15, wherein the inter-working unit further comprises:
a third interface to the ISDN for user information according to modem information for an analog public switched network; and
a selector for selecting one of the first and third interfaces depending on an opposite party data terminal.

17. The mobile communications system according to claim 15, wherein the second interface selectively transmits a first setup message and a second setup message to the ISDN depending on the opposite party data terminal, the first setup message having an information element set to an unlimited bearer service of 64 kbps, and the second message having the information element set to a 3.1 kHz-Audio bearer service of 64 kbps.

18. The mobile communications system according to claim 17, wherein the selector first selects the first interface and the second interface transmits the first setup message and, if a connection fails to be set up, then the selector selects the third interface and the second interface transmits the second setup message to the ISDN.

* * * * *